INVENTORS
ROBERT W. HARTUNG
CLAYTON D. HUFFMAN

ATTORNEYS

INVENTORS
ROBERT W. HARTUNG
CLAYTON D. HUFFMAN

BY *Beaman & Beaman*

ATTORNEYS

INVENTORS
ROBERT W. HARTUNG
CLAYTON D. HUFFMAN
BY Beaman & Beaman
ATTORNEYS

INVENTORS
ROBERT W. HARTUNG
CLAYTON D. HUFFMAN

ATTORNEYS

United States Patent Office 3,509,984
Patented May 5, 1970

3,509,984
ARTICLE ORIENTING CONVEYOR
Robert W. Hartung and Clayton D. Huffman, Albion, Mich., assignors to Union Steel Products Company, Albion, Mich.
Filed May 6, 1968, Ser. No. 726,915
Int. Cl. B65g 47/24, 15/00, 17/00
U.S. Cl. 198—33                              8 Claims

ABSTRACT OF THE DISCLOSURE

An article orienting conveyor consisting of two parallel and separate endless conveyor strands capable of being driven at different speeds wherein articles simultaneously supported upon and conveyed by both conveyor strands may be selectively oriented relative to the general direction of conveyor movement while being conveyed. Novel article engaging means are utilized to facilitate orientation and maintain uniformity and consistency of orientation.

Background of the invention

The field of the invention lies in the art of endless conveyors wherein articles are simultaneously supported upon a plurality of parallel conveyor strands and the orientation of the conveyed articles changes during conveyance.

Normally, endless conveyors used in the transportation of articles from one location to another discharge the conveyed article in the same orientation to the direction of movement as the article was received upon the conveyor. It is not unusual in the material handling art to desire to change the orientation of conveyed articles while being transported. Such a changing of article orientation may be necessary because of secondary operations to be performed on the article such as painting, packaging, printing, stacking, or the like, and the most common orientation change is to pivot the article about a vertical axis 90°.

Article orientation of conveyed articles can be accomplished by complex "turning" apparatus positioned over the conveyor which receives and grasps the conveyed article and repositions the article upon the conveyor as desired. Also, with some types of articles of simplified form a change in orientation can be accomplished by relatively simple abutment and lever devices which engage one side of the article causing the article to pivot about a stationary point.

Complicated "turning" devices are expensive, and often lack versatility when being used in conjunction with conveyors conveying articles of different sizes and shapes. The simpler forms of turning devices which primarily constitute abutments for temporarily restraining a side or corner of the article to cause a pivoting of the article on the conveyor are often not dependable and precise in operation, and are often not suitable for use where an accurate orientation is required.

Another solution to the orienting of conveyed articles that has been practiced consists of conveying the articles upon a plurality of parallel conveyor strands wherein the article is simultaneously supported upon at least two conveyor belts or equivalent structure. If the conveyor strands supporting a common article are moving in the direction of conveyance at different speeds a "turning" or pivoting of article about a vertical axis occurs during conveyance. U.S. Pats. Nos. 1,192,832, 2,652,143, 3,047,123 and 3,084,090 disclose conveyors of this type. While this type of conveyor provides a relatively inexpensive and dependable means for orienting conveyed articles, such conveyors are normally contructed for a particular application, and are not versatile enough for general use. Also, as such conveyors do not permit ready variation of the difference in speeds between the two conveyor strands supporting a common article the degree and manner of orientation cannot be readily changed.

The U.S. Pat. to Kerr et al., 3,367,474, discloses a conveyor of the aforementioned type which provides for drive means capable of readily varying the conveying velocity of at least one of the conveyor strands, and therefore provides an accurate and positive control over the orientation of articles conveyed thereby. This patent recognizes the importance of the type of engagement between the conveyor and the articles being conveyed, and Kerr et al., employs relatively expensive construction techniques to produce a conveyor capable of operating in the desired manner. Kerr et al., finds it necessary with the disclosed conveyor to "slant" the article conveying elements of each conveyor strand downwardly toward the area separating the strands, and indicates that the most desirable support of the articles occurs at the outer edges of the article. This arrangement causes localized wear on the conveyed articles at the edges and necessitates an expensive drive and idler shaft arrangement.

It is an object of the invention to provide an improved article conveying apparatus which avoids the expensive construction of Kerr et al., and produces a more dependable and accurate orientation than is provided by the patented art. Furthermore, it is a purpose of the invention to provide article supporting means which are of such versatility as to permit support of a wide variety of article shapes and configurations with no excessive wear occurring and still produce an accurately controllable article orientation.

Summary of the invention

The conveyor apparatus of the invention basically consists of a framework upon which two substantially parallel endless conveyor strands are supported. The conveyor strands may travel in a linear direction, or may be oriented in an arcuate path, as is the case with the described embodiment.

Each of the conveyor strands are driven by a drive roller cooperating with a chain. One of the conveyor strands is driven at a uniform velocity while variable speed drive transmission means permit the conveying velocity of the other strand to be readily varied. Concise drive shaft orientation structure is utilized to reduce manufacturing costs and minimize space requirements.

Each of the conveyor strands consists of a plurality of elongated article supporting components in the form of slats which are affixed to conveyor chains and having a length transversely disposed to the direction of movement of the chains. The slate, at any time, forming the top of the conveyor strand form the article supporting surface and the articles being conveyed bridge the conveyor strands to be supported upon the slats of both strands.

In that the orientation of conveyed articles results from a pivoting about a vertical axis of the article due to the different velocities of movement of the conveyor strands relative movement between the conveyed articles and the slats is continuously occurring. In order to facilitate the "pivoting" of the articles during orientation it is of advantage to engage the under side of the articles at relatively limited areas of contact. To permit such contact between the slats and articles the slats are of a unique configuration. Each of the slats are identical in shape, and are of a generally convex configuration in an upward longitudinal direction, while defining the article supporting surface. As the longitudinal length of the slats is transverse to the direction of conveyor movement, the longitudinal convexity of the slats produces a "high point" at the central region of the slats, and permits the supported article to be supported at the central region of the slats at limited contact areas.

Also, in order to facilitate the "pivoting" of the articles being conveyed the slats are of a convex configuration in a cross section transverse to the longitudinal direction of the slats. Thus, the "sliding" of the articles over the slats is unhindered and a uniform and consistent orientation of the articles is provided by the difference in conveyor strand velocities.

It is therefore an object of the invention to provide an article orienting conveyor capable of consistently and accurately orienting articles being conveyed, and wherein a concise control of the orientation may be maintained and regulated.

Another object of the invention is to provide an article orienting conveyor of economical construction capable of transporting a wide variety of article configurations and sizes.

An additional object of the invention is to provide an article orienting conveyor utilizing a pair of generally parallel endless conveyor strands each employing a plurality of slats to define the article supporting surface. The slats being of a unique construction and configuration as to support conveyed articles for uniform orientation regardless of configuration and dimension, without causing undue and localized wear, and to insure a uniform and "smooth" movement of the article upon the conveyor while being oriented.

Brief description of the drawings

The aforementioned objects of the invention will be appreciated from the following description and accompanying drawings wherein.

Description of the preferred embodiments

Figure 8:
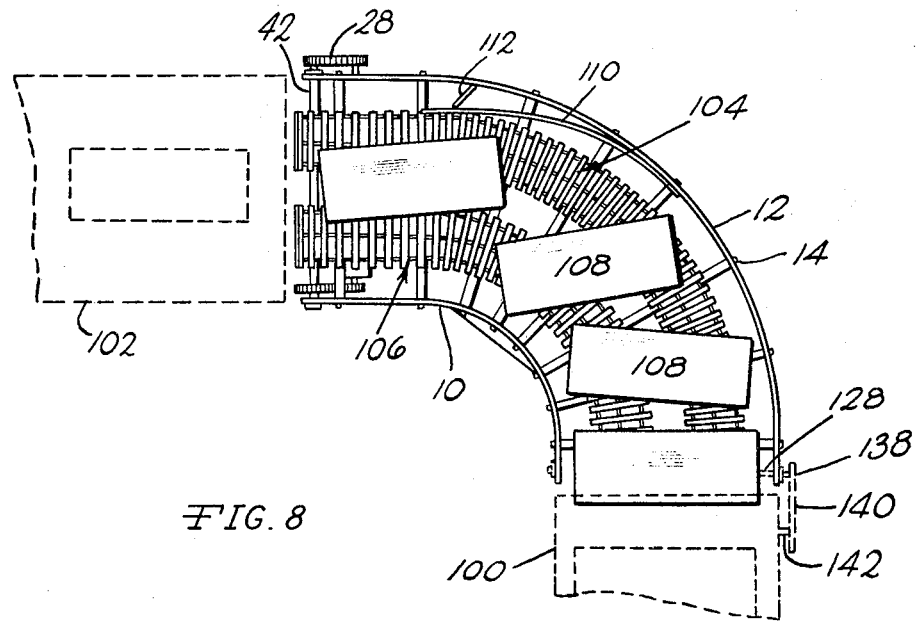
FIG. 8 is a plan view of the conveyor of the invention illustrating the orientation of articles being conveyed, and illustrating auxiliary cooperating conveyors in dotted lines.
Figure 9:
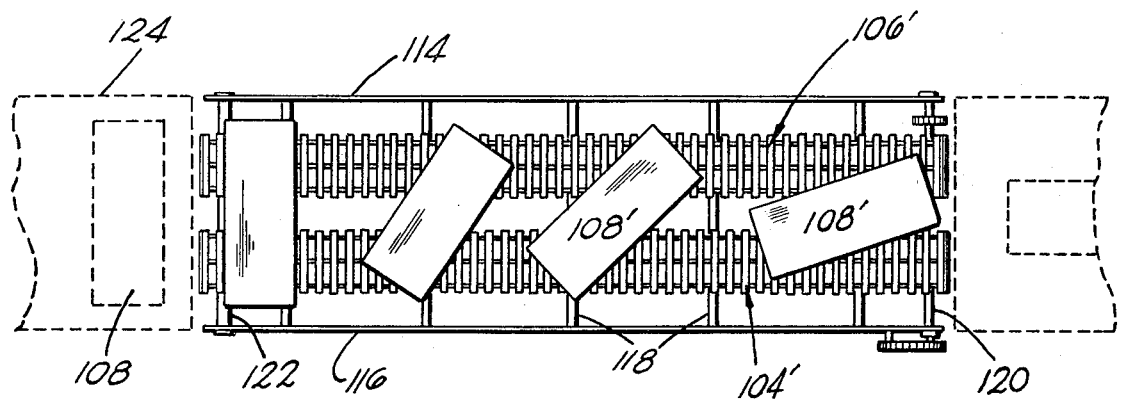
FIG. 9 is a plan view of another embodiment of the invention in a linear form.

The inventive concept of the invention can be employed with any configuration of conveyor, with respect to the direction of conveyance. For instance, while FIGS. 1 through 8 illustrate the inventive concepts used in connection with a 90° conveyor, the principles involved can be employed with a linear conveyor, such as shown in FIG. 9, or other configuration. The orienting conveyor described will normally constitute only a portion of a complete material handling system, and will normally be used in conjunction with conventional nonorienting conveyors, such as illustrated in dotted lines in FIG. 8. It may be desired to orient conveyed articles several times during the process of handling, and in such event orienting conveyors in accord with the invention may be interposed where desired in a conveying system.

Referring to FIGS. 1 through 8, the basic conveyor frame includes an inner arcuate plate 10 and a concentric outer plate 12. The plates 10 and 12 are maintained in spaced relationship by a plurality of spacer rods 14 extending between the plates, and the spacer rods are provided with a plurality of spacing sleeves 16 for supporting the conveyor rails, as will be later described.

Figure 2:
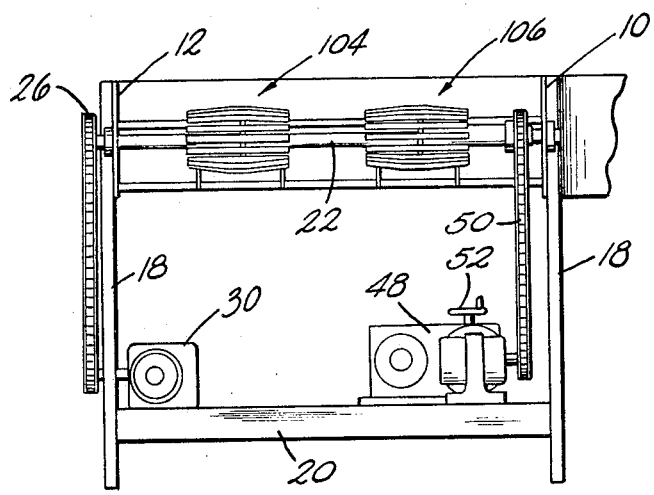
FIG. 2 is a nelevational view of the drive shaft end of the conveyor.
Figure 3:
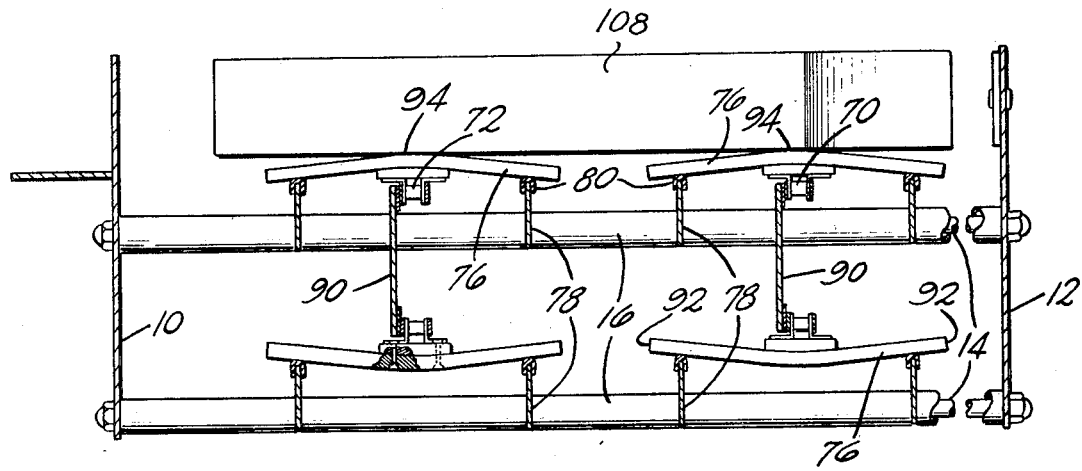
FIG. 3 is an elevational sectional view taken along Section III—III of FIG. 1, illustrating an pan-type article being conveyed.

The plates 10 and 12 are supported upon a plurality of legs 18 affixed to the plates downwardly extending therefrom. And in this manner the frame may be supported at an elevated position relative to the floor. A horizontally disposed transmission mounting shelf 20, FIG. 2, is interposed between the legs 18 located below the conveyor drive shaft.

While the illustrated embodiment illustrates a horizontally disposed conveyor, it will be appreciated that the conveyor frame may be obliquely disposed to the horizontal wherein conveying may occur in either an upward or downward direction.

Figure 1:
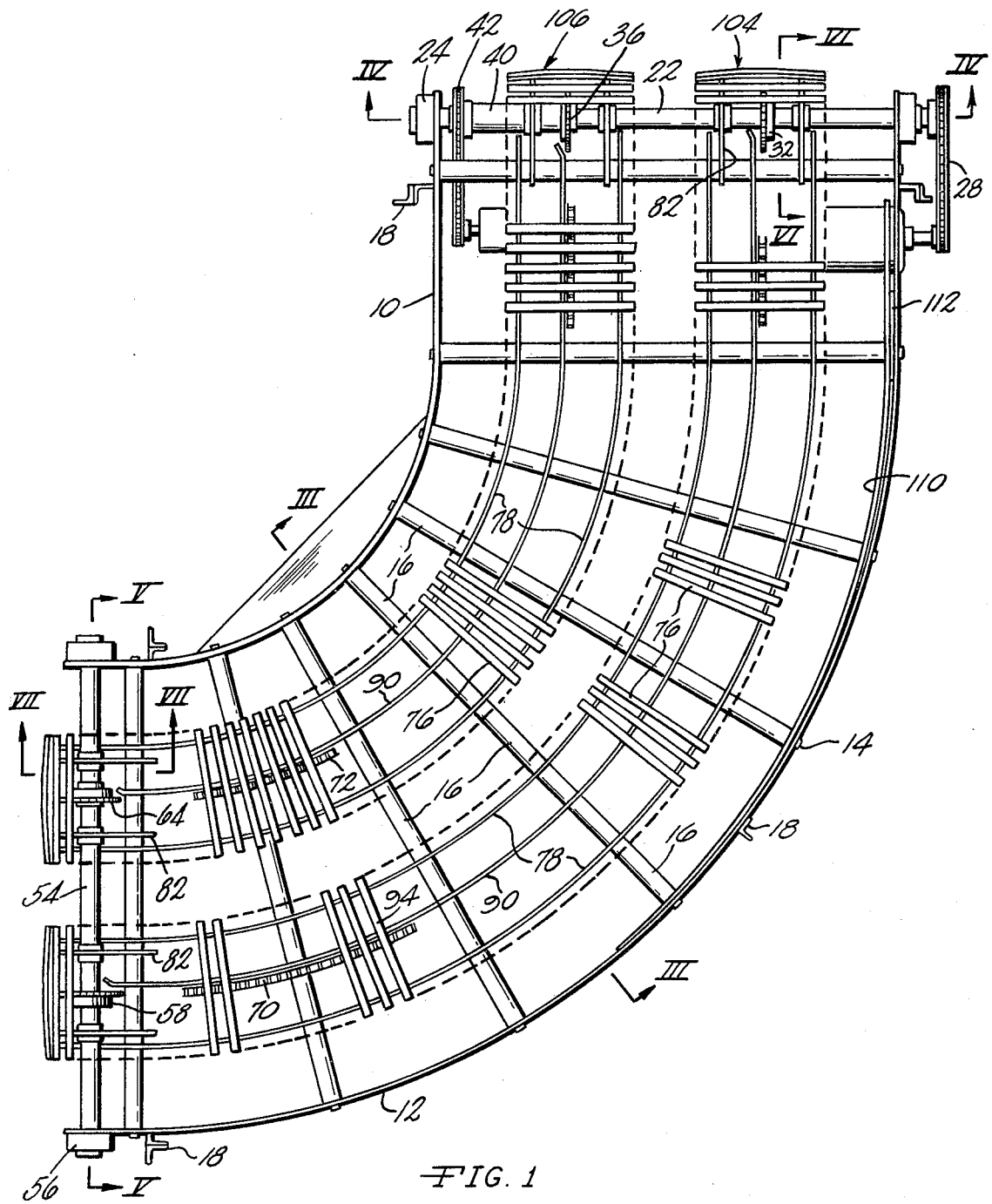
FIG. 1 is a plan view of an article orienting conveyor constructed in accord with the invention, the conveyor chains and slats being fragmentarily illustrated.

A cylindrical drive shaft 22 is imposed between the plates 10 and 12 adjacent one end thereof, FIG. 1, and is rotatably supported upon the plates by bearings 24. One end of the shaft 22 extends beyond the plate 12 and is provided with a chain roller or sprocket 26 driven by the chain 28 which meshes with a sprocket rotated by a constant speed electric motor transmission 30 mounted upon shelf 20.

The "outer" conveyor strand components are driven through a chain roller or sprocket 32 keyed to the shaft 22 at 34 wherein the sprocket will rotate at the same rotational velocity as the drive shaft.

Figure 4:
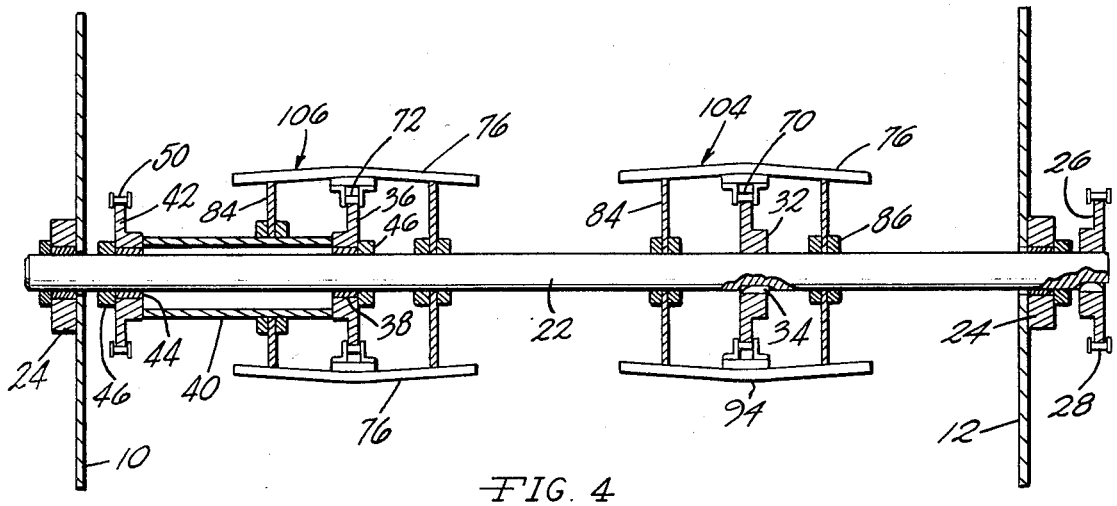
FIG. 4 is an elevational sectional view taken through the drive shaft along Section IV—IV of FIG. 1.

The "inner" conveyor strand components are driven through a chain sprocket 36 rotatably mounted upon the drive shaft 22 by a bearing 38, FIG. 4. A drive tube 40 is concentrically positioned over the drive shaft 22 and is fixed at one end to the sprocket 36. A chain sprocket 42 rotatably supported upon the drive shaft 22 by bearing 44 is fixed to the other end of the drive tube 40, and locking collars 46 mounted upon the drive shaft 22 bear against the sprockets 36 and 42 to axially position the sprockets, and the drive tube, upon the drive shaft. Thus, it will be appreciated that the sprockets 36 and 42 are rotatably supported upon the drive shaft for rotation with respect thereto about the axis of the shaft.

The sprocket 42 is connected to a variable speed electrical powered transmission 48 by means of chain 50. The transmission 48 is mounted upon the frame shelf 20 and may be of any conventional nature, such as the well known Varidrive produced by U.S. Motors. The variable speed driving transmission 48 is provided with a control handle 52, FIG. 2, whereby rotation of the handle permits the transmission to infinitely vary the speed at which the sprocket 36 is driven, between predetermined limits, of course.

Figure 5:
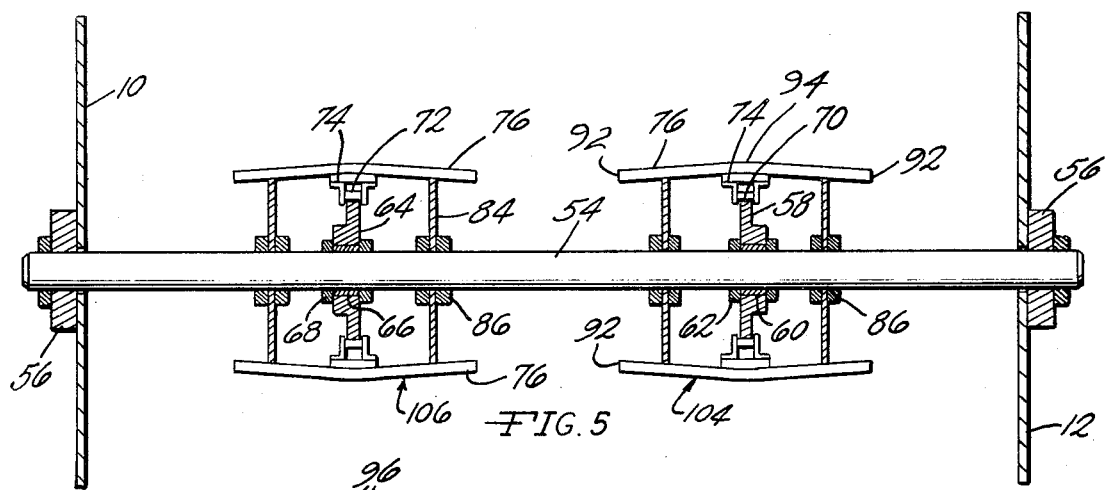
FIG. 5 is an elevational sectional view taken through the idler shaft along Section V—V of FIG. 1.

A conveyor idler shaft 54 is mounted upon the other end of the plates 10 and 12 remote from the drive shaft 22. The idler shaft 54 may be rotatably mounted on the plates such as shown in the embodiment in FIG. 10, or may be nonrotatably fixed to the plates by blocks 56 as shown in FIG. 5. The outer conveyor idler sprocket 58 is mounted upon the shaft 54 upon a bearing 60, and axially positioned by lock collars 62. The inner, or variable speed conveyor strand includes the idler sprocket 64 rotatably mounted upon the shaft 54 by bearing 66 and is axially positioned by lock collars 68.

A chain 70 extends over the sprockets 32 and 58, and a similar chain 72 extends over the sprockets 36 and 64. The chains are of the "loose pin" type wherein lateral bending of the chain is possible without producing stresses. This type of chain is necessary with a 90° conveyor such as illustrated.

The chains are provided with a plurality of slat attachment brackets 74 mounted thereon, and each bracket serves to support a conveyor slat 76. The conveyor slats 76 are of an elongated configuration and extend substantially perpendicular to the length of the associated chain. Intermediate the drive shaft 22 and the idler shaft 54 the slats are supported upon rails 78, a rail being disposed upon opposite sides of each of the conveyor strand chains. As will be apparent in FIG. 3, the rails are mounted upon the conveyor frame by the spacer rods 14 and located by the sleeves 16 encompassing the spacer rods. The upper edge of the rails is provided with a wear-resistant cap 80 which may be of metal, nylon, or other wear-resisting material.

Guiding of the slats as the chain passes over the drive or idler sprockets is maintained by a pair of strippers 82 associated with each sprocket, a stripper being mounted upon each side of the associated sprocket. The strippers are provided with a bore 84 whereby the associated drive or idler shaft may extend therethrough, and the strippers are maintained in position by lock collars 86. Angular movement of the strippers relative to the associate shaft is prevented by introduction of a spacer rod and sleeve into a slot 88 defined in the strippers, FIG. 7. The strippers may be formed of a nonmetallic material, such as fiberboard, for instance.

In the 90° embodiment of conveyor being described an arcuate chain guide 90 is associated with each of the strand chains 70 and 72 to maintain the arcuate configuration of the conveyor strands. The guides 90 are supported upon spacer rods 14 and are positioned by sleeves 16.

The slats 76 are of a form which is best appreciated from FIGS. 1, 4, 5, 6 and 7. As previously mentioned the slats are of a narrow elongated configuration and will usually be formed of metal, although other materials could be employed. As shown in FIGS. 4 and 5 the slats include opposite ends 92 and a central region 94 at which the supporting bracket 74 is mounted by means of rivets or similar fasteners. The slats ends 92 are displaced from the horizontal plane of the central region 94 in a common direction wherein when the slats are forming an upwardly facing article supporting surface the slat ends 92 will be disposed downwardly with respect to the central region. Thus, the central region forms a "high point" or protrusion and support of the article being conveyed occurs at the central region, FIG. 3.

Figure 7:
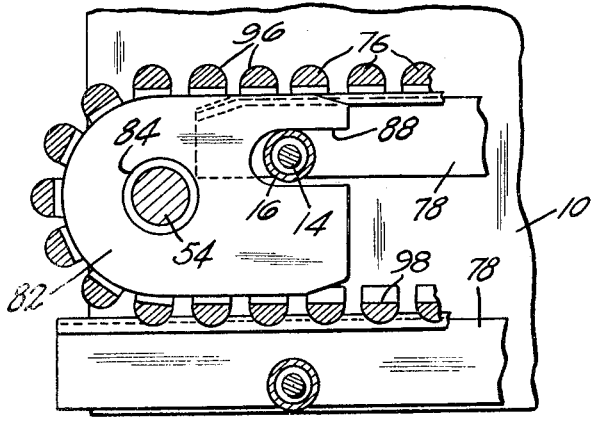
FIG. 7 is an elevational sectional view illustrating the conveyor strippers as taken through the idler shaft along Section VII—VII of FIG. 1.
Figure 6:
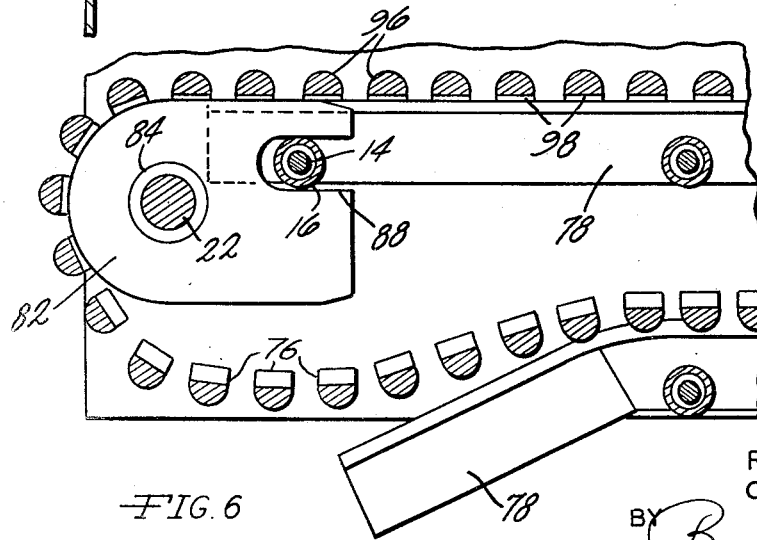
FIG. 6 is a cross sectional elevational view taken through the drive shaft along Section VI—VI of FIG. 1.

The cross-sectional configuration of the slats 76 will be appreciated from FIGS. 6 and 7 wherein a preferred form of the slat indicates that the slat is of a generally half round configuration resulting in a convex outer surface 96, and a flat undersurface 98 which engages the rails 78. The convex configuration of the slats in a cross sectional direction substantially eliminates the possibility of the article being conveyed from "snagging" upon a slat as the article is pivoted during orientation.

The aforedescribed construction of the slats permits the weight of the article being conveyed to be applied to the center of the slats, which results in uniform wearing of the rails, and other conveyor components, and permits a uniform distribution of the weight being conveyed to the conveyor. Also, as the primary contact of the slats with the article being conveyed occurs at the slat central regions engagement with the articles is not confined to the outer edges of the article, and prevents excessive wear upon the article being conveyed from occurring at any particular location. This latter consideration is of significance in systems conveying baking pans, for instance, wherein the baking pans are being continually reused and reconveyed over the conveyor system.

Operation

In use, the conveyor of the invention may be installed in a conveyor system as to constitute a right angle bend of the system. In FIG. 8 the conveyor supplying the article orienting conveyor of the invention is represented in dotted lines at 100 while the conveyor receiving the oriented articles from the orienting conveyor is represented in dotted lines at 102.

To place the conveyor of the invention in operation the motors associated with the constant speed transmission 30 and the variable speed transmission 48 are energized. Rotation of the drive shaft 22 through sprocket 26 at a uniform velocity will occur which causes the chain 70 and the slats 76 of the "outer" conveyor strand 104 to move at a uniform velocity.

The operator adjusts the variable speed control 52 to produce the desired rate of rotation of the drive sprocket 36 to produce the desired velocity of movement of the "inner" conveyor strand 106. Usually, the conveyor strand 106 will be moving at a faster rate than the outer strand 104. By rotating the control 52 the rate of movement of the conveyor strand 106 may be very accurately controlled.

FIG. 8 illustrates the orientation of rectangular articles as they are conveyed by the invention. As the articles 108, such as baking pans, are received on the conveyor at the idler shaft end from the conveyor 100 the articles are disposed such that the greatest length is perpendicular to the general direction of travel. The articles 108 bridge both strands of the conveyor as to be simultaneously supported upon the slats of each conveyor strand, FIG. 3. In that the conveyor chain 72 is moving at a considerably greater rate than the conveyor chain 70 the articles 108 begin to pivot upon the conveyor slats about a vertical axis in a clockwise direction, FIG. 8. In that the articles are being supported upon the central regions 94 of the slats pivoting of the articles readily occurs without causing significant lateral displacement of the articles upon the conveyor slats and uniform orientation of the articles is achieved.

The difference in the rate of movement between the conveyor chains 70 and 72 is such that as the articles leave the conveyor at the drive shaft end thereof the length of the articles 108 is disposed parallel to the receiving conveyor 102, and the articles have traversed a 90° rotation while carried upon the conveyor. Thus, orientation of the articles has occurred continuously while being carried upon the conveyor strands and the articles may be spaced relatively close together without interfering with each other, and without interruption of article movement.

If desired, a guide strip 110 may be attached to the frame at one end at approximately the middle of the plate 12, and adjustable means 112 consisting of a link permits the free end of the guide to be positioned at an inoperative position as shown in FIG. 1, or to an operative position as shown in FIG. 8. The purpose of the guide strip 110 is to center articles leaving the orienting conveyor if the articles were originally mis-centered when being received upon the conveyor strands from the conveyor 100. Use of the guide strip 110 is optional, and is determined by the accuracy with which the articles are received upon the strands 104 and 106.

FIG. 9 represents an embodiment of the invention wherein the conveyor is of linear form. The conveyor includes side frame plates 114 and 116 maintained in space relationship by spacer rods and sleeves 118. The drive shaft is represented at 120 and the idler shaft is represented at 122. The slats, sprockets, rails, strippers and other components, including the constant and variable speed drive transmissions of this embodiment are identical with those of the previously described embodiment to define strands 104' and 106'. The conveyor receives articles 108' transversely lengthwise disposed to the direction of conveyance from the conveyor 124. As the articles are conveyed by the orienting conveyor they are rotated in a clockwise direction as to leave the conveyor with the longitudinal dimension now parallel with the direction of conveyance. In that the slat configuration of this embodiment is identical to the previously described embodiment the advantages previously mentioned above apply to this form of the invention.

Figure 10:
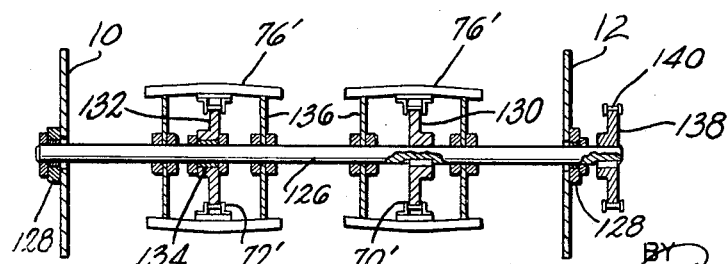
FIG. 10 is an elevational sectional view of an idler shaft variation for use with the variation of idler shaft illustrated in dotted lines in FIG. 8.

FIG. 10 illustrates a variation in the idler shaft construction which permits the uniform velocity conveyor strand 104 of the orienting conveyor to supply the power for the conveyor 100 conveying articles onto the orienting conveyor. In FIG. 10 a "live" idler shaft 126 is mounted within bearings 128 affixed upon the conveyor side plates 10 and 12. The idler sprocket 130 associated with the uniform velocity conveyor strand is keyed to the shaft 126 for rotation thereof. The variable speed sprocket 132 is rotatably mounted upon the shaft by bearing 134, and collars maintain the axial location of the sprocket. Strippers 136 are mounted upon the drive shaft for supporting the slate 76' associated with the chains 70' and 72' of the respective conveyor strands.

The outer end of the shaft 126 extends through the bearing on the plate 12 and is provided with a chain sprocket 138 whereby a chain 140, FIG. 8, may transmit the rotation of the idler shaft 126 to the drive shaft 142 of the adjacent conveyor 100. Thus, this arrangement removes the necessity for a separate drive for the associated feeding conveyor 100, and assures uniformity in the rate of movement between the article orienting conveyor and the feeding conveyor.

As described above, it will be appreciated that the unique slat configuration of the orienting conveyor described will provide improved support of the conveyed articles, permitting a uniform rotation of the articles and insuring accurate locating of the articles on the conveyor strands while being oriented. Also, the slat construction prevents excessive wear at particular locations upon the article being conveyed, and the guide rails, drive shafts, sprockets and other components may be constructed in the most economical manner wherein oblique angles and drive shafts are eliminated assuring long bearing life, and minimizing the number of moving components.

It is appreciated that various modifications to the inventive concept may be apparent to those skilled in the art without departing from the spirit and scope of the invention, and it is intended that the invention may be defined only by the following claims.

We claim:

1. An article orienting conveyor capable of changing the orientation of articles conveyed thereon with respect to the direction of conveyance comprising, in combination, a frame, a first endless chain movably mounted on said frame, a second endless chain movably mounted on said frame and disposed adjacent and coplanar to said first chain, a plurality of slats affixed to each of said chains forming article supporting surfaces, an article supporting protrusion defined upon said slats for engaging and supporting the article being conveyed, said protrusion forming a limited area of engagement with the conveyed article to permit rotation of the article during orientation, said slots being longitudinally disposed in a direction transverse to the direction of movement of the associated chain, each of said slats being of an upwardly convex configuration in its longitudinal direction when defining said article supporting surfaces wherein said protrusion constitutes the central region of the associated slat, a constant speed drive means connected to said first chain adapted to drive said first chain at a uniform velocity, and a variable speed drive means connected to said second chain adapted to drive said second chain at a velocity different from that of said first chain whereby the orientation of an article simultaneously supported upon the slats of said chains is progressively changed while being conveyed and the rate of changing orientation is variable by varying the output of said variable speed drive means and the velocity of said second chain.

2. In an article orienting conveyor as in claim 1 wherein each of said slats is of an outwardly convex configuration in the direction of movement of the associated chain when defining said article supporting surfaces.

3. An article orienting conveyor capable of changing the orientation of articles conveyed thereon with respect to the direction of conveyance comprising, in combination, a frame, a drive shaft rotatably mounted on said frame, a first drive roller fixed upon said shaft, a first drive element mounted upon said drive shaft, a second drive roller rotatably mounted upon said drive shaft, a second drive element concentrically fixed relative to said second drive roller and concentrically rotatable relative to said drive shaft, first and second idler rollers mounted on said frame, a first endless conveyor strand extending between and guided by said first rollers, a second endless conveyor strand extending between and guided by said second rollers, said first and second conveyor strands being mounted on said frame in adjacent substantially parallel relationship, a constant speed drive means connected to said first drive element for rotating said drive shaft, a variable speed drive means connected to said second drive element for rotating said second drive roller, and adjustment means associated with variable speed drive means for varying the rate of rotation of said second drive roller and rate of movement of said second conveyor strand relative to the rate of movement of said first conveyor strand.

4. An article orienting conveyor as in claim 3 wherein a drive tube is concentrically mounted upon said drive shaft for rotation relative thereto, said second drive roller being fixed to said tube and said second drive element being fixed to said tube.

5. In an article orienting conveyor as in claim 4, an idler roller shaft fixed upon said frame, said first and second idler rollers being rotatably mounted upon said idler shaft.

6. In an article orienting conveyor as in claim 4, an idler shaft rotatably mounted upon said frame, said first idler roller being fixed to said idler shaft, bearing means rotatably mounting said second idler roller upon said idler shaft, and a power take-off sheave mounted upon said idler shaft.

7. In an article orienting conveyor as in claim 4 wherein said conveyor strands each include a plurality of elongated parallel slats transversely disposed to the direction of movement of the associated conveyor strand each of said slats being of an outwardly convex configuration in its elongated direction defining a convex supporting surface having a single location of contact with conveyed articles.

8. In an article orienting conveyor as in claim 7, wherein said slats also include an outer surface of an arcuate convex configuration in the direction of movement of the associated conveyor strand.

References Cited

UNITED STATES PATENTS 2,652,143   9/1953   Doren _____ 198—182
3,367,474   2/1968   Kerr _____ 198—33

EDWARD A. SROKA, Primary Examiner

U.S. Cl. X.R.

198—182

UNITED STATES PATENT OFFICE
CERTIFICATE OF CORRECTION

Patent No. 3,509,984            Dated May 5, 1970

Inventor(s) Robert W. Hartung and Clayton D. Huffman

It is certified that error appears in the above-identified patent and that said Letters Patent are hereby corrected as shown below:

Column 7, line 56, delete "slots" and substitute --slats--

Column 8, line 37, delete "4" and substitute --3--;

Column 8, line 41, delete "4" and substitute --3--;

Column 8, line 47, delete "4" and substitute --3--

SIGNED AND SEALED
SEP 8 - 1970

(SEAL)
Attest:

Edward M. Fletcher, Jr.
Attesting Officer

WILLIAM E. SCHUYLER, JR.
Commissioner of Patents